United States Patent
Barsilai et al.

(10) Patent No.: US 10,013,859 B2
(45) Date of Patent: *Jul. 3, 2018

(54) INTEGRATED CIRCUIT WITH SINGLE WIRE HAPTIC VIBRATION CONTROL AND SELECTIVE OPEN LOOP OPERATION

(71) Applicant: Texas Instruments Incorporated, Dallas, TX (US)

(72) Inventors: Mandy Barsilai, Richardson, TX (US); David Hernandez, Dallas, TX (US); Mark Stephen Toth, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,975

(22) Filed: Jun. 30, 2017

(65) Prior Publication Data

US 2017/0301196 A1    Oct. 19, 2017

Related U.S. Application Data

(63) Continuation of application No. 14/955,553, filed on Dec. 1, 2015, now Pat. No. 9,697,706.

(60) Provisional application No. 62/086,252, filed on Dec. 2, 2014.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC .................................. G08B 6/00; G06F 3/016
See application file for complete search history.

(56) References Cited

U.S. PATENT DOCUMENTS

| 6,831,750 | B2 | 12/2004 | Mehrl et al. |
| 8,686,839 | B2 | 4/2014 | Posamentier |
| 9,697,706 | B2 * | 7/2017 | Barsilai .................... G08B 6/00 |
| 2010/0116562 | A1 | 5/2010 | Cruz-Hernandez et al. |
| 2012/0232780 | A1 | 9/2012 | Delson et al. |

(Continued)

OTHER PUBLICATIONS

Precision Microdrives Product Data Sheet, Pico Vibe, 3mm Vibration Motor—8mm Type, Model 303-100, 2014 Precision Microdrives Limited, pp. 1-4.

(Continued)

*Primary Examiner* — Leon Flores
(74) *Attorney, Agent, or Firm* — Michael A. Davis, Jr.; Charles A. Brill; Frank D. Cimino

(57) ABSTRACT

Disclosed examples include methods and circuits to drive a haptic actuator, in which a single input signal from a host device has a first state representing a command to drive the actuator and a second state representing a command to stop the actuator. A control circuit provides a drive control signal to a driver circuit to drive the haptic actuator in response to the control signal transitioning to the first state, and to stop the haptic actuator in response to the control signal transitioning to the second state. A timer circuit places the circuit in a low power mode a predetermined time after the control signal transitions to the second state, or the control circuit places the circuit in the low power mode in response to a feedback signal indicating that the actuator has reached a stopped condition.

18 Claims, 9 Drawing Sheets

(56) References Cited

U.S. PATENT DOCUMENTS

2014/0118126 A1  5/2014 Garg et al.
2015/0137713 A1  5/2015 Barsilai et al.
2015/0204925 A1  7/2015 Hernandez et al.

OTHER PUBLICATIONS

Haptics Solutions for ERM and LRA Actuators, Texas Instruments, TI.com/touch, 2013, 5 pgs.
Texas Instruments, DRV2604, Haptic Driver for ERM and LRA With Internal Memory and Smart Loop Architecture, SLOS824—Dec. 2012, 6 pgs.
Texas Instruments, DRV2605, Haptic Driver for ERM and LRA With Built-In Library and Smart-Loop Architecture, SLOS825C—Dec. 2012, Revised Sep. 2014.

* cited by examiner

INTEGRATED CIRCUIT WITH SINGLE WIRE HAPTIC VIBRATION CONTROL AND SELECTIVE OPEN LOOP OPERATION

CROSS-REFERENCE TO RELATED APPLICATIONS

This application is a continuation of U.S. patent application Ser. No. 14/955,553 filed Dec. 1, 2015, which claims priority to U.S. Provisional Patent Application Ser. No. 62/086,252 filed Dec. 2, 2014, all of which are hereby fully incorporated herein by reference for all purposes.

BACKGROUND

This relates generally to haptic devices, and more particularly to circuits and methods for driving haptic actuators according to a single wire control.

Haptic devices are used in a variety of applications to provide tactile feedback and alerts to users of many consumer devices. For instance, haptic actuators are typically provided in mobile phones to create tactile feedback for users pressing touchscreen softkeys and/or for vibrating the phone to provide silent ringing notification of incoming calls. Also, haptic devices are used to convert audio signals to haptic effects to provide automatic haptics for music, games, movies and the like. Various haptic actuators have been developed, including linear resonant actuators (LRAs) having a spring-loaded mass accelerating and decelerating along a linear axis, as well as eccentric rotating mass (ERM) motors having an eccentric mass affixed to a rotating motor rotor. Haptic actuators are driven by signals causing the actuator to vibrate. Many user devices thus include driver circuits for signaling haptic actuators. The tactile user experience is enhanced by the capability of providing a variety of different distinguishable vibratory signals. Many driver circuits include on-board waveform libraries with a large number of predefined haptic effects or waveforms that can be requested by a host processor through a serial digital interface, such as SPI, I²C, etc., for playback, with a trigger input allowing the waveform playback to be initiated by the host device. Certain haptic driver circuits also include pulse width modulation (PWM) inputs allowing a host device to provide a PWM input signal for tactile actuation, and the driver adjusts the amplitude of a playback waveform according to the PWM input frequency. An enable input is also provided in certain drivers to allow a host device to place the driver circuit in a low power mode.

Maximum acceleration and deceleration of an LRA mass or and ERM motor is important for providing discernible haptic signals to a user. Haptic actuator performance is quantified in terms of start time from zero acceleration to maximum acceleration, and braking or brake time representing the time from maximum acceleration to a rest condition. Some driver circuits for a resonant actuator generate actuator signals at the mechanical resonant frequency, and employ active braking for stopping the actuator quickly. This is done through resonance tracking using detected back EMF representing the velocity of the mass of the haptic actuator to identify and track resonance, and closed loop feedback is used to enhance haptic actuator response time through automatic overdrive and braking control. In the case of an LRA, resonance tracking uses non-trivial configuration by a host device, typically achieved through a digital interface. Many drivers use only open loop control. In these systems, the actuator device is manually characterized, and an appropriate waveform is streamed by a PWM input or a digital interface to achieve fast braking, or the waveforms can be stored in an internal memory of the driver circuit. Power efficiency is also important in battery-powered user devices, and designers of host circuitry need a controllable interface to achieve desired haptic signaling by interfacing with driver circuitry for a variety of end-use applications without unduly consuming battery power.

SUMMARY

Disclosed examples include methods and circuits to drive a haptic actuator. In one example, a circuit with a single input receives a control signal from a host device indicating first and second states to respectively drive the actuator and to stop the actuator to implement a single line control. A control circuit drives the haptic actuator in response to the control signal transitioning to the first state, and stops the actuator in response to the control signal transitioning to the second state. A timer circuit places the circuit in a low power mode a predetermined time after the control signal transitions to the second state. Certain examples include a loop control circuit to command the control circuit for closed loop control according to a feedback signal, or open loop control, and operation is automatically switched to closed loop control for braking operation. In certain examples, the control circuit drives the haptic device using a first waveform shape selected by the host device, and uses a second waveform shape for stopping or braking the haptic device.

Further disclosed examples include a method, comprising using a drive circuit, driving a haptic actuator to a fixed amplitude using automatic overdrive in response to a control signal transitioning to a first state, stopping the haptic actuator using active braking in response to the control signal transitioning to a different second state, and placing the drive circuit in a low power mode a predetermined time after the control signal transitions to the second state. In certain examples, the haptic actuator is driven to the fixed amplitude using open loop control and stopped using closed loop control according to a feedback signal. Certain examples further include driving the haptic actuator to the fixed amplitude using a first waveform shape and stopping the haptic actuator using a different second waveform shape.

DETAILED DESCRIPTION OF EXAMPLE EMBODIMENTS

Figure 1:
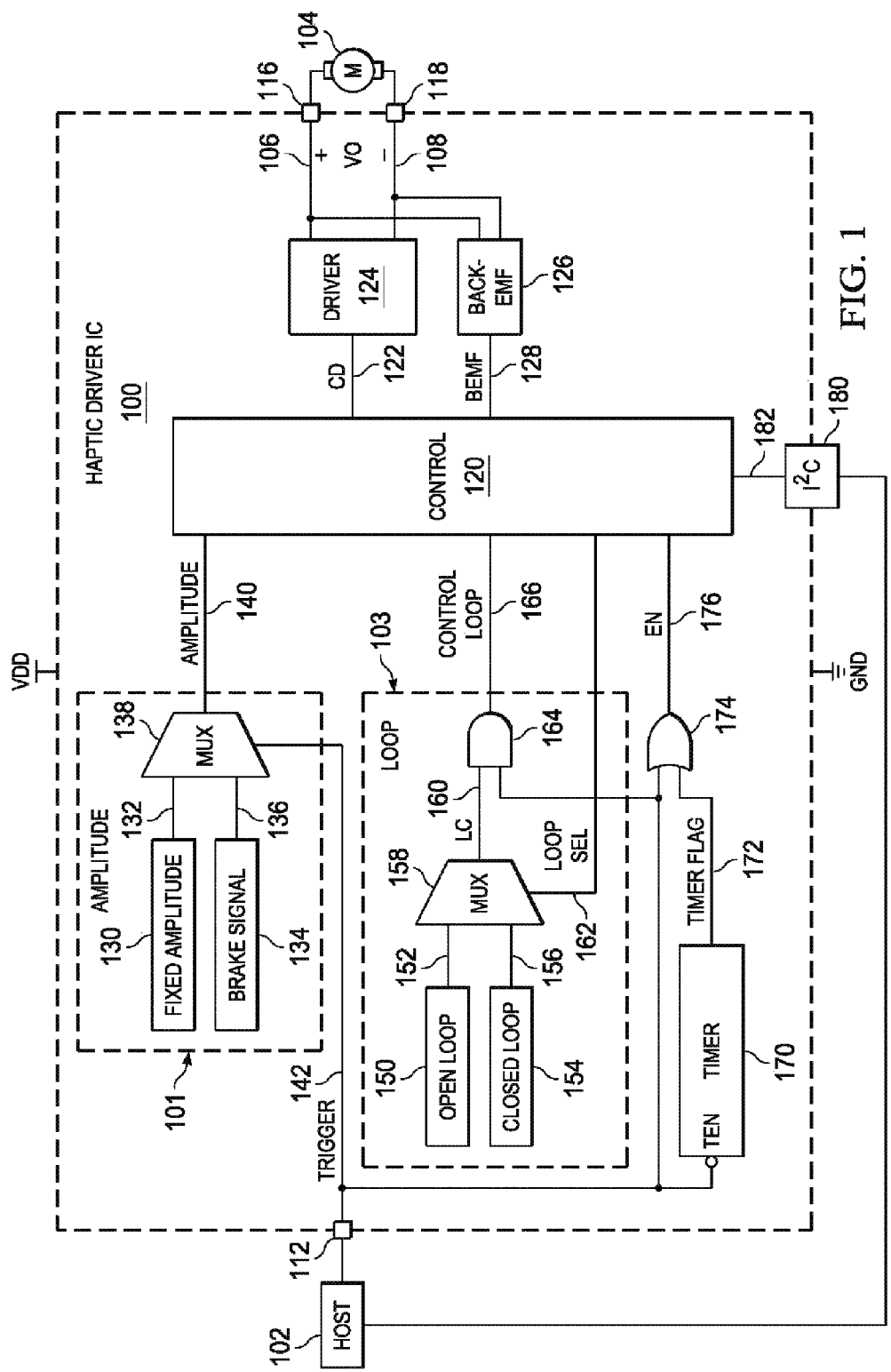
FIG. 1 is a schematic diagram showing a haptic driver IC.

In the drawings, like reference numerals refer to like elements throughout, and the various features are not necessarily drawn to scale. In this description, the terms "including," "includes," "having," "has," "with" or variants thereof are inclusive in a manner, and thus should be interpreted to mean "including, but not limited to." Also, in this description, the term "couple" or "couples" includes indirect or direct electrical connection or combinations thereof. For example, if a first device couples to or is coupled with a second device, that connection may be through a direct electrical connection, or through an indirect electrical connection via one or more intervening devices and connections.

FIG. 1 shows a haptic system including a haptic driver circuit 100 interfacing a host circuit or host device 102 with a haptic actuator 104. The driver IC 100 can operate various forms of haptic actuators 104, for example LRAs or ERM motors. In one example, the driver circuit 100 is provided in an integrated circuit (IC) with connections for receiving a supply voltage VDD and a ground connection GND, along with various pins 112, 116 and 118 for interconnection with other circuitry of a host circuit board (not shown). In the example of FIG. 1, the host device 102 is a circuit device, such as a host processor, mounted on a host circuit board along with the haptic driver IC 100. The host device 102 provides a control signal TRIGGER to the driver IC 100 via a pin 112 of the IC 100 to cause the driver IC 100 to drive the haptic actuator 104. The driver IC 100 includes an amplitude control circuit 101 with an input 142 to receive the control signal TRIGGER, as well as an amplitude control output 140 to provide an amplitude signal AMPLITUDE to a control circuit 120. The circuit 101 in one example includes a multiplexer 138 that operates according to the control signal TRIGGER in order to provide the AMPLITUDE signal at the output 140 according to a first input 132 for a control input signal TRIGGER in the first state (HI) for operation according to a non-zero fixed amplitude 130. For LO TRIGGER signals, the multiplexer 138 provides the AMPLITUDE signal from a second input 136 according to a brake signal 134 to drive the haptic actuator 104 to a rest condition. The IC 100 further includes a loop control circuit 103 receiving the TRIGGER signal and commanding the control circuit 120 to operate in a closed loop control mode or an open loop control mode via a CONTROL LOOP signal provided at an output 166.

The IC 100 also includes a timer circuit 170 that receives the TRIGGER control signal at a trigger enable input TEN. The timer circuit 170 has an output 172 providing a timer signal TIMER FLAG, and a logic gate or circuit 174, in this case and OR gate receiving the TIMER FLAG signal and the TRIGGER signal to provide an enable signal EN from a logic output 176 to a corresponding enable control input of the control circuit 120. In one example, a LOOP SEL signal is controlled internal to the IC 100 to place the control circuit 120 in closed or open loop control mode. For example, the LOOP SEL signal can be hard-coded in the IC 100, or it can be controlled by the host using an I²C interface 180, 182 or by other digital means. In certain examples, the control circuit 120 provides the LOOP SEL signal to an input 162 of a loop control circuit 103 as shown in FIG. 1. In another example, the IC 100 includes a pin (not shown) to receive a loop select signal LOOP SEL from the host device 102 to provide the input 162 to the loop control circuit 103.

The haptic actuator 104 is connected to a driver circuit 124 of the driver IC 100 by first and second output pins 116 and 118. The driver circuit 124 has positive (+) and negative (−) outputs 106 and 108 to provide a driver output signal VO to drive the connected haptic actuator 104. The control circuit 120 provides a drive control signal CD to an input 122 of the driver circuit 124 according to the AMPLITUDE signal when the enable signal EN is in a first active enable signal state (e.g., HI in one example). The control circuit 120 can also implement closed loop control according to one or more feedback signals. The IC 100 in FIG. 1 includes a back-EMF feedback circuit 126 which senses back EMF from the driven haptic actuator 104. The feedback circuit 126 includes an input coupled with the driver circuit output lines 106 and 108 to sense an operating condition (e.g., back EMF) of the haptic actuator 104. An output 128 of the feedback circuit 126 provides a feedback signal BEMF to the control circuit 120.

In operation, the TRIGGER control signal and the corresponding single input pin 112 of the driver IC 100 provides a single wire control interface that allows the host device 102 to specify the start and duration of the haptic actuator operation. The driver 100 in one example automatically starts and goes to a fixed amplitude in response to a start signal (e.g., a rising edge, or high-level in the TRIGGER signal), and then stops the actuator 104 in response to a stop signal (e.g., falling edge or low level in the TRIGGER signal). In addition, the driver IC 100 advantageously provides for automatic mode transition into a low power or "sleep" mode a predetermined time after a transition in the TRIGGER signal by operation of the timer circuit 170. By this operation, the driver IC 100 offloads significant control overhead from the host device 102, and provides for intelligent power conservation. In another example, the timer circuit 170 and the OR gate 174 can be omitted, and the EN signal input to the control circuit 120 is connected directly to the line 142 to receive the TRIGGER signal. In this example, the control circuit 120 monitors the back EMF signal BEMF from the feedback circuit 126 after the EN signal goes low, and switches the driver IC 100 to the low-power mode in response to the feedback signal BEMF indicating that the actuator 104 has come to a rest or stop condition.

The example of FIG. 1, the IC 100 includes a serial communications interface, for example, an I²C interface 180 which may include serial data and clock lines (not shown) to provide a communications input 182 to the control circuit 120. This interface 180 can be used in certain examples by the host device 102 in order to designate a host-selected waveform shape used by the control circuit 120 in driving the haptic actuator 104. In addition, the interface provides data and/or command exchange between the host device 102 and the control circuit 120.

Figure 2:
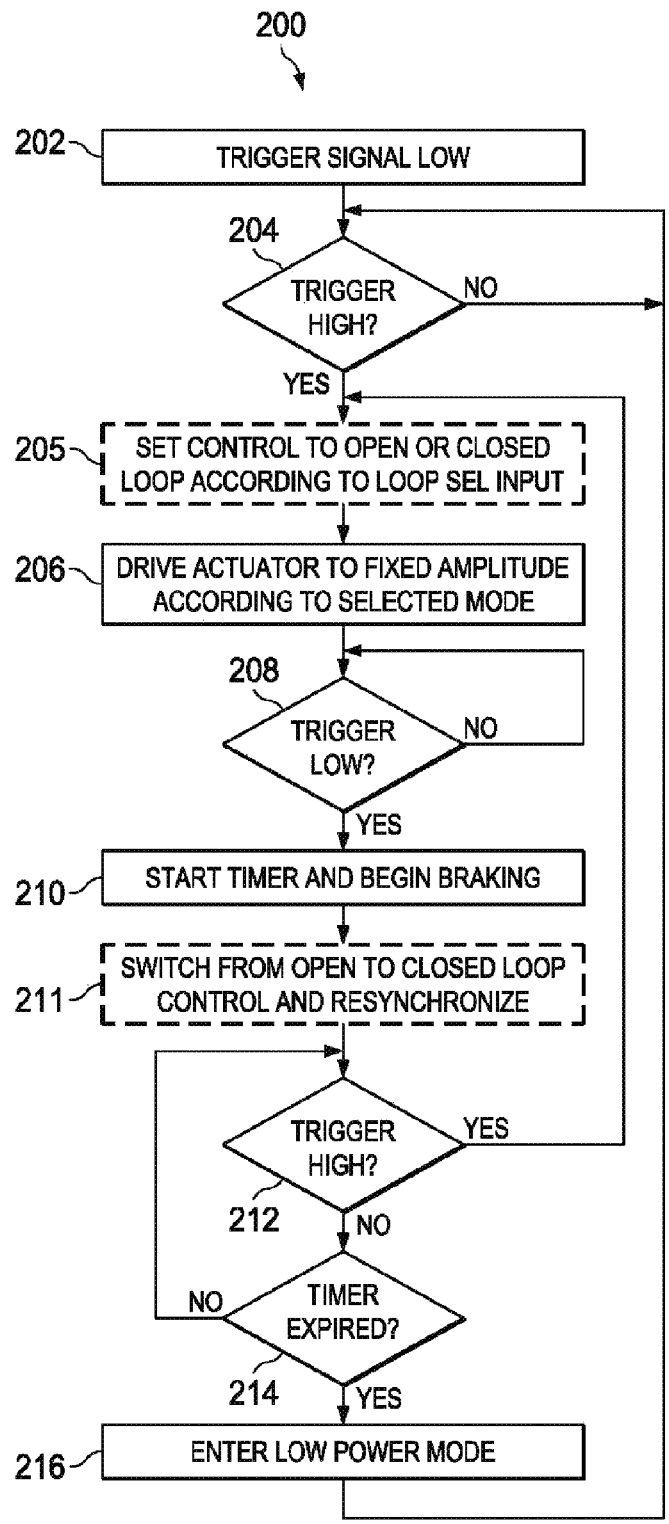
FIG. 2 is a flow diagram of a method of driving a haptic actuator using a driver integrated circuit.

Referring also to FIG. 2, a process or method 200 is illustrated to drive a haptic actuator 104, which can be implemented using the driver circuit IC 100 of FIG. 1. The control circuit 120 in one example operates in a first mode to provide the drive control signal CD to the driver circuit 124 to drive the haptic actuator 104 in response to the control signal TRIGGER transitioning to a first state (e.g., HI). In response to the control signal TRIGGER transitioning to a different second state (e.g., LO), the control circuit 120 operates in a second mode to stop the haptic actuator 104. The timer circuit 170 places the circuit 100 in a low power mode a predetermined time after the control signal TRIGGER transitions to the second state LO. The illustrated process 200 begins at 202 with the TRIGGER signal initially low, and the IC 100 in one example may initially be in a low power or "sleep" mode at 202 in FIG. 2. The IC 100 determines at 204 whether the TRIGGER signal has transitioned to a first state (e.g., HI). If not (NO at 204), the IC 100 remains in the low power mode until the TRIGGER signal transitions to the HI state. In response to the single control signal TRIGGER transitioning to the first state (YES at 204), the IC 100 enters the first operating mode. In certain examples, the CONTROL LOOP signal optionally sets the control operation of the control circuit 120 to either open loop or closed loop control mode at 205 in FIG. 2.

At 206 in FIG. 2, the control circuit 120 drives the haptic actuator 104 to a fixed amplitude using the selected driving mode (either open-loop or close-loop) according to the LOOP SEL signal. In one example, the control circuit 120 drives the haptic actuator 104 at 206 according to a first host-selected waveform shape, such as a sinewave. In another example, the control circuit 120 drives the actuator 104 at 206 using open loop control according to the LOOP SEL signal from the host device 102, or according to a LOOP SEL signal determined by the control circuit 120 according to programmed instructions from the host device 102 via the serial interface 180.

Figure 3:
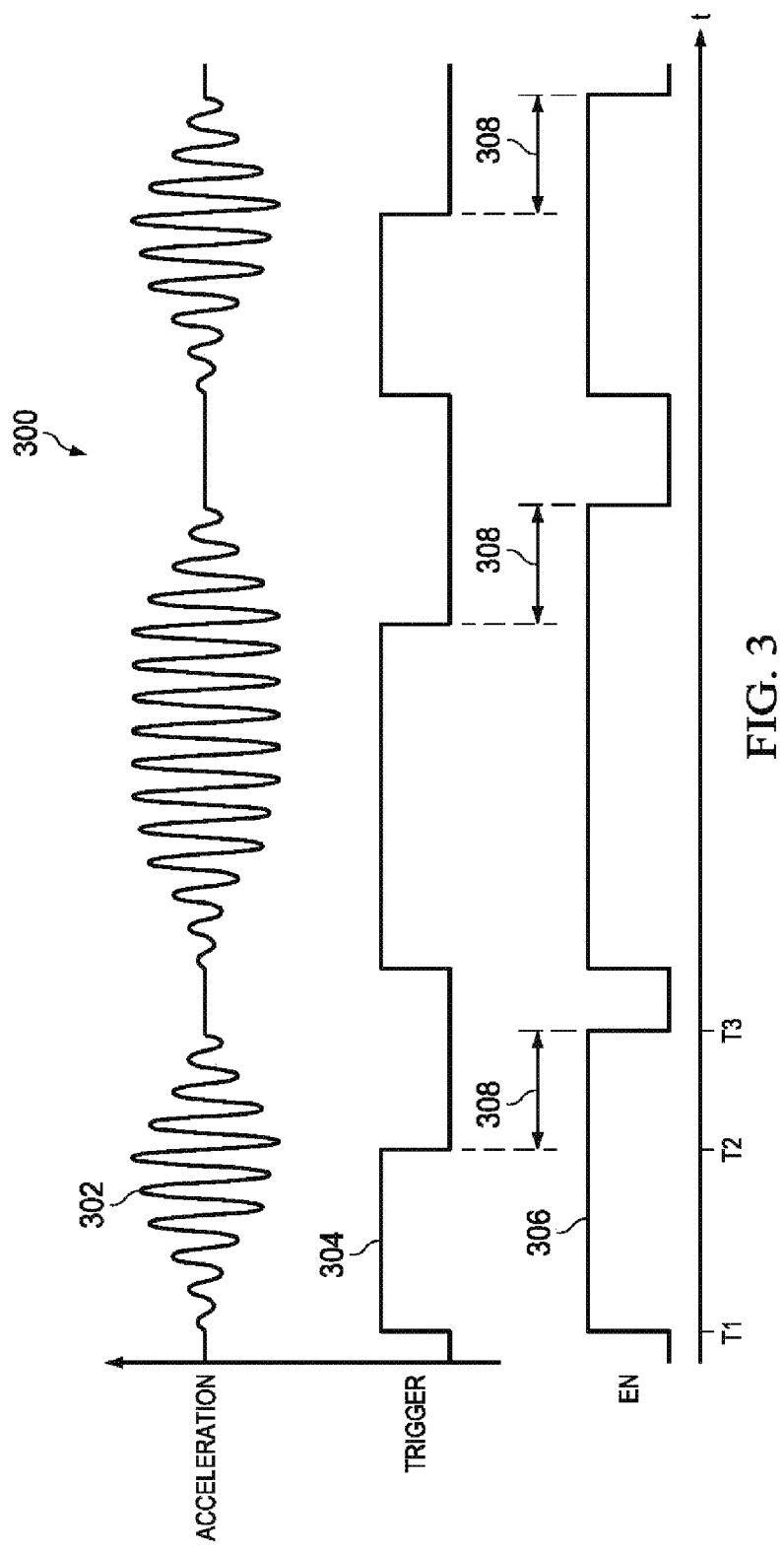
FIG. 3 is a diagram of acceleration, control, and enable waveforms in one example of the haptic driver IC of FIG. 1.

Referring also to FIG. 3, a graph 300 shows a haptic device acceleration curve 302, a TRIGGER control signal curve 304, and an enable waveform 306 curve (EN) in one example of the haptic driver IC 100 of FIG. 1. As seen in FIG. 1, the enable signal EN (and waveforms 306 in FIGS. 3-6) is generated internal to the IC 100, for example, by the timer circuit 170 and the gate 174 in one embodiment, and is not generated by the host device 102. In one example, the TRIGGER signal curve 304 transitions from low to high at T1. The IC 100 identifies the signal transitions based on either edge sensing or level sensing. In response to the transition in the TRIGGER signal at T1, the control circuit 120 provides the drive control signal CD to the driver circuit 124 in order to drive the haptic actuator 104 to initially accelerate, as shown in the acceleration curve 302, ultimately reaching a fixed amplitude indicated by the fixed amplitude 130 in FIG. 1.

Returning to FIG. 2, in the first mode, the IC 100 determines at 208 whether the control signal TRIGGER has transitioned to the second state (LO). If not (NO at 208), the driving operation continues in the first mode. Once the control signal TRIGGER transitions to the second state (YES at 208), the timer circuit 170 (FIG. 1) starts by receiving a low signal at the TEN input, and the control circuit 120 begins active braking at 210 FIG. 2 according to the brake signal 134 in FIG. 1. In certain examples, moreover, if the operation in the first mode was performed using open loop control at 206, the control circuit 120 is switched from open loop to closed loop control in the second mode, and the control circuit 120 is resynchronized to the actuator 104 at 211. In the second mode, the IC 100 monitors the control signal TRIGGER at 212, and if the control signal is again transitioned to the first state (e.g., HI, YES at 212) prior to expiration of the timer circuit 170, the process 200 returns to operation in the first mode at 205 and 206 as previously described. Otherwise (NO at 212), the IC 100 awaits expiration of the predetermined time via the timer circuit 170 at 214. This process at 212 and 214 continues until either the TRIGGER signal reverts to the first state or the timer expires. Once the timer expires with the TRIGGER signal remaining low (YES at 214), the timer circuit 170 provides a low enable signal EN to the control circuit 120 at 216 to cause the IC 100 to enter the low power mode. The process 200 then returns to 204 to await the next actuation of the TRIGGER control signal by the host device 102. Until then, the IC 100 is in a low-power mode, thus facilitating ultralow power consumption for the host system.

Returning again to FIG. 3, the control signal TRIGGER changes from the first state (HI) to the second state (LO) at T2, thus activating the timer circuit 170 in FIG. 1, and causing the amplitude control circuit 101 to provide the AMPLITUDE signal to the control circuit 120. This causes the control circuit 120 in one example to generate the drive control signal CD using active braking in a closed loop control mode beginning at T2. This operation continues, with the acceleration curve 302 having a decreasing amplitude envelope. In this example, moreover, the timer circuit 170 sets the timer signal TIMER FLAG high at the output 172 at T2, and the TIMER FLAG signal remains high for a predetermined time 308 shown in FIG. 3. Any suitable predetermined time 308 can be used, for example, about 50 ms in one implementation. In certain examples, the predetermined time 308 is set to allow sufficient time for automatically stopping or breaking the haptic actuator 104. As previously mentioned, the control circuit 102 in another example automatically detects whether the actuator 104 is stopped based on the BEMF signal from the feedback circuit 126, and the timer circuit 170 and OR gate 174 can be omitted. The OR gate 174 in the example of FIG. 1 generates the enable signal EN at the output 176, which is initially brought active high at T1 as shown in curve 306 in FIG. 3 in response to the control signal TRIGGER going high. When the TRIGGER signal (curve 304) goes low at T2, the OR gate 174 receives a high timer signal TIMER FLAG from the timer circuit 170, and thus the EN signal (curve 306) remains high until the TIMER FLAG signal goes low the predetermined time 308 after the TRIGGER signal goes low at T2. The control circuit 120 transitions to the low power mode in response to the EN signal going low at T3. This operation continues as shown in the graph 300 of FIG. 3 with the IC 100 responding to further actuations of the TRIGGER signal by the host device 102. As seen in FIG. 3, the IC 100 advantageously allows the host device 102 to selectively control the beginning of haptic actuation and also the duration of haptic actuator operation. The host 102 in these examples only need provide a single control signal TRIGGER having a first control signal state HI representing a command to begin driving the haptic actuator 104, and a second control signal state LO representing a command to stop the haptic actuator 104. Moreover, the IC 100 automatically enters the low power mode to facilitate power efficiency in the host system, which is particularly advantageous for battery-powered portable user devices such as mobile phones or the like.

Figure 4:
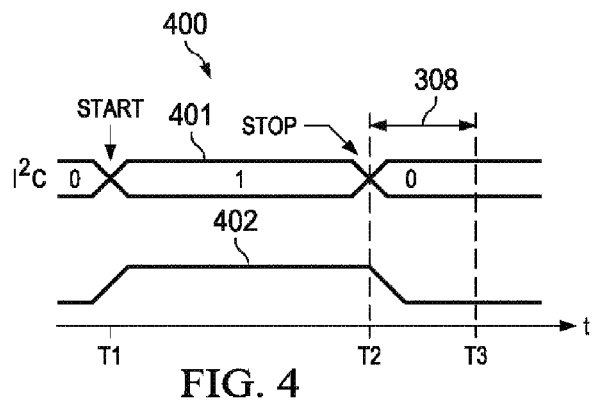
FIG. 4 is a diagram of waveforms in another example of the haptic driver IC of FIG. 1.

FIG. 4 provides a graph 400 showing a waveform 401 representing data written to the control circuit 120 by the host device 102 in another example of the haptic driver IC of FIG. 1. In this example, the IC 100 is responsive to transitions by the host device 102 writing a register bit from 0 to 1 using the I2C interface 180 or other digital interface. In this case, the data transition from 0 to 1 is indicated as "Start" in FIG. 4, and the second control signal state is indicated by a transition of the data bit from 1 to 0, indicated as "Stop" in FIG. 4. FIG. 4 further shows an amplitude envelope curve 402 illustrating the amplitude of the acceleration of the haptic actuator 104 (e.g., the envelope of the acceleration curve 302 in FIG. 3 above). As seen in FIG. 4, the acceleration amplitude curve 402 accelerates and remains at the fixed amplitude level until the Stop signal is received at T2. The control circuit 120 in this example employs active braking or other closed loop operation beginning at T2 in order to bring the haptic actuator 104 to a rest condition, and the control circuit 120 remains in the activated state until T3 at the expiration of the predetermined time 308 after T2. In this example, the control circuit 120 can provide an input to the timer circuit 170 in order to implement the predetermined time 308. In another example, the control circuit 120 can implement the predetermined time 308 internally, or can selectively place the IC 100 into the low-power "sleep" mode after it determines that the actuator 104 has come to rest based on feedback signal BEMF from the feedback circuit 126, in which case the EN signal is not needed.

Figure 5:
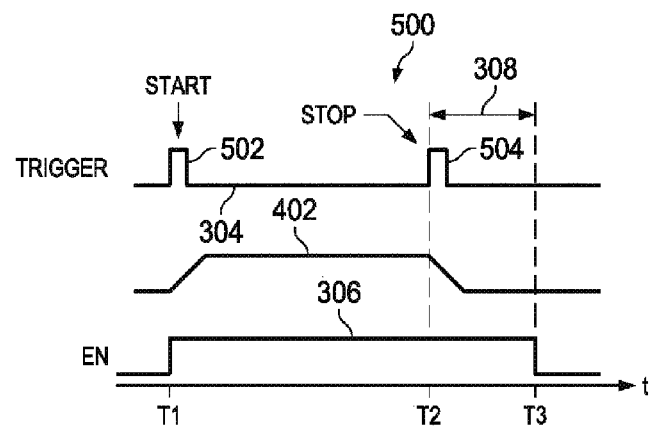
FIG. 5 is a diagram of waveforms in another example of the haptic driver IC of FIG. 1.

FIG. 5 provides a graph 500 showing waveforms in another example of the haptic driver IC of FIG. 1. In this example, the first control signal state of the control signal TRIGGER is indicated by a first pulse 502, and the second control signal state of the TRIGGER signal is indicated by a second pulse 504 received after the first pulse 502. The IC 100 is responsive to pulses as opposed to merely voltage levels or edge transitions in the control signal TRIGGER in this example. This example, moreover, allows the host device 102 to designating control the beginning of haptic actuation as well as the duration of a haptic signal using a single wire interface through the input pin 112.

Figure 6:
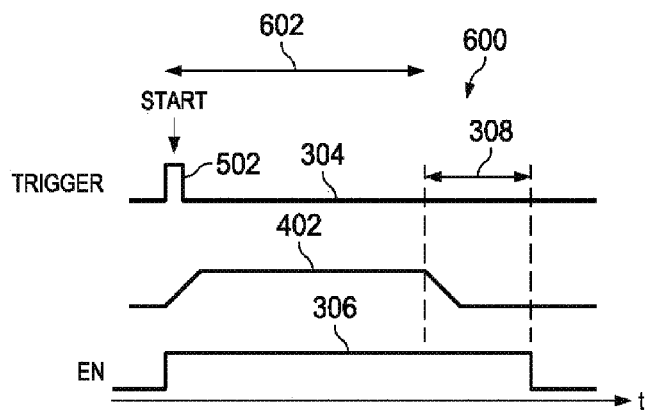
FIG. 6 is a diagram of waveforms in another example of the haptic driver IC of FIG. 1.

FIG. 6 shows a graph 600 illustrating TRIGGER, amplitude envelope, and EN waveforms in another example of the haptic driver IC of FIG. 1. In this case, the IC 100 is responsive to control signal pulses as well as timing considerations after an initial pulse is received. As seen in FIG. 6, the first control signal state of the TRIGGER signal is indicated by a first pulse 502 from the host device 102, as in the example of FIG. 5 described above. In the example of FIG. 6, however, the second control signal state of the TRIGGER signal is indicated by non-receipt of a second pulse within a second predetermined time 602 after receipt of the first pulse 502. In this example, the driver IC 100 implements fixed duration haptic actuations, and the host device 102 need only provide a single pulse signal 502 to indicate the start time for the desired actuation of the haptic actuator 104.

Returning to FIG. 1, in certain examples, the control circuit 120 uses open or closed loop control for one or both of active driving and active braking operations at least partially according to the CONTROL LOOP signal from the loop control circuit 103. For closed loop operation, the control circuit 120 operates according to the BEMF feedback circuit 126. Open loop operation can be according to a variety of different drive control signal waveforms provided to the driver circuit 124. Moreover, the control circuit 120 in certain implementations allows the host device 102 to designate or select a waveform shape for driving the haptic actuator 104 either in both driving and braking modes. In other examples, the host-selected waveform shape (e.g., sinewave) can be employed in open loop control for driving the haptic actuator 104, and the control circuit 120 reverts or automatically switches to closed loop control using a default waveform shape (e.g., square wave) for braking operation in the second mode. The loop control circuit 103 provides the CONTROL LOOP signal in one example in order to selectively command the control circuit 120 to provide the drive control signal CD in a closed loop control mode according to the amplitude signal AMPLITUDE and the feedback signal BEMF, or in an open loop control mode according to the amplitude signal AMPLITUDE.

As seen in FIG. 1, the loop control circuit 103 includes a first input 142 to receive the control signal TRIGGER, as well as a second input 162 to receive the loop select signal LOOP SEL. The circuit 103 also includes a first circuit 158, such as a multiplexer with an output 160 to provide a loop control signal LC in a first loop control signal state (e.g., HI) based on a first input 152 to represent a command 150 for open loop control in response to receiving the loop select signal LOOP SEL in the first state (e.g., HI). In response to receiving the signal LOOP SEL in a different second state (e.g., LO), the first circuit 158 provides the signal LC in a different second loop control signal state (e.g., LO) based on a second input 156 to represent a command 154 for closed loop control. The circuit 103 also includes an AND gate or other second logic circuit 164 receiving the LC and TRIGGER signals as inputs. The second logic circuit output 166 of the gate 164 provides the CONTROL LOOP signal to the control circuit 120 in an active first state HI to command the control circuit 120 to provide the drive control signal CD in the open loop control mode according to the amplitude signal AMPLITUDE when the loop control signal LC is in the first loop control signal state HI and the control signal TRIGGER is in the first control signal state HI. Otherwise, when the loop control signal LC is in the second loop control signal state LO or the control signal TRIGGER is in the second control signal state LO, the gate 164 provides the signal CONTROL LOOP in a second state LO to command the control circuit 120 to provide the drive control signal CD in the closed loop control mode according to the amplitude signal AMPLITUDE and the feedback signal BEMF. In this manner, the loop control circuit 103 commands closed loop control mode operation in response to the control signal TRIGGER transitioning from the first control signal state HI to the second control signal state LO, regardless of whether open loop control was used.

Referring also to FIGS. 7-12, FIGS. 7A and 7B illustrate a flow diagram 700 showing open and closed loop control operation of the IC 100 in one example to drive a linear resonant actuator (LRA) 104. The control circuit 120 in certain examples implements control processing as described in U.S. patent application Ser. No. 14/502,493, filed Sep. 30, 2014 and entitled "Adaptive Linear Resonance Actuator Controller", assigned to Texas Instruments Incorporated, the entirety of which is hereby incorporated by reference.

Figure 7A:
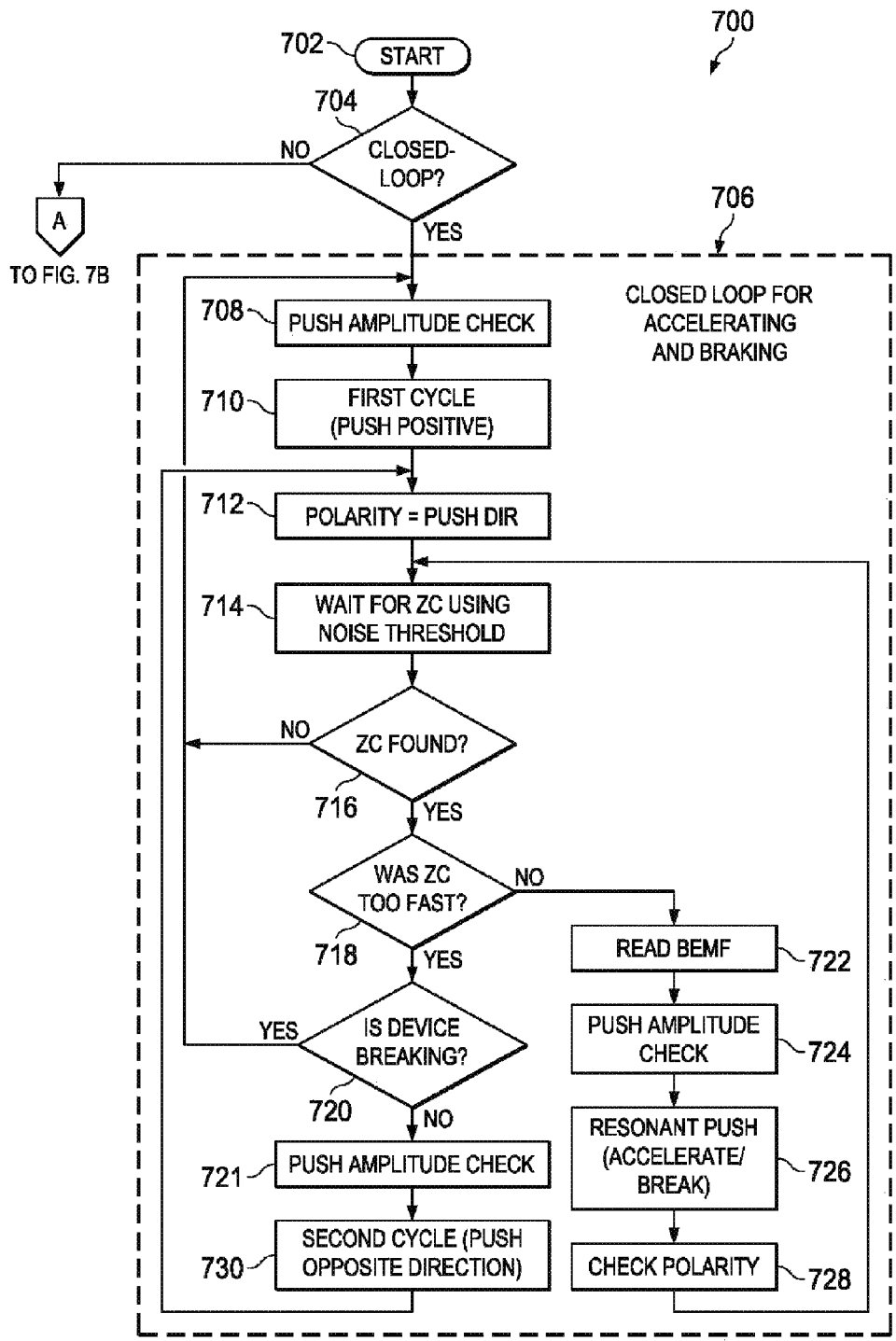
FIGS. 7A and 7B depict a flow diagram showing example open and closed loop control operation in one example of the haptic driver IC of FIG. 1 to drive a linear resonant actuator.

The process 700 begins or starts at 702 in FIG. 7A, and the control circuit 120 makes a determination at 704 as to whether closed loop operation is commanded based on the CONTROL LOOP signal from the loop control circuit 103 in FIG. 1. If so (YES at 704), a closed loop command 706 is implemented (e.g., closed loop command 154 in FIG. 1). A push amplitude check is performed at 708 in which the control circuit 120 assesses the feedback signal BEMF and determines whether a push amplitude is less than a predetermined low limit, and if so sets a push amplitude for use by the controller 120 in "pushing" the actuator 104 in the same direction it is currently traveling. At 710 a first cycle push is performed in a positive direction, and a polarity flag is set at 712 indicating the push direction (e.g., 1 for positive and 0 for negative in one example) The controller 120 waits for a zero crossing at 714, and may involve assessing lack of back EMF signal amplitude (e.g., below a threshold noise floor) from the feedback circuit 126 to indicate zero crossings by the tactile actuator 104. A determination is made at 716 as to whether a zero crossing event has been detected, and if not, the closed loop processing 706 returns to 708 as previously described.

Figure 7B:
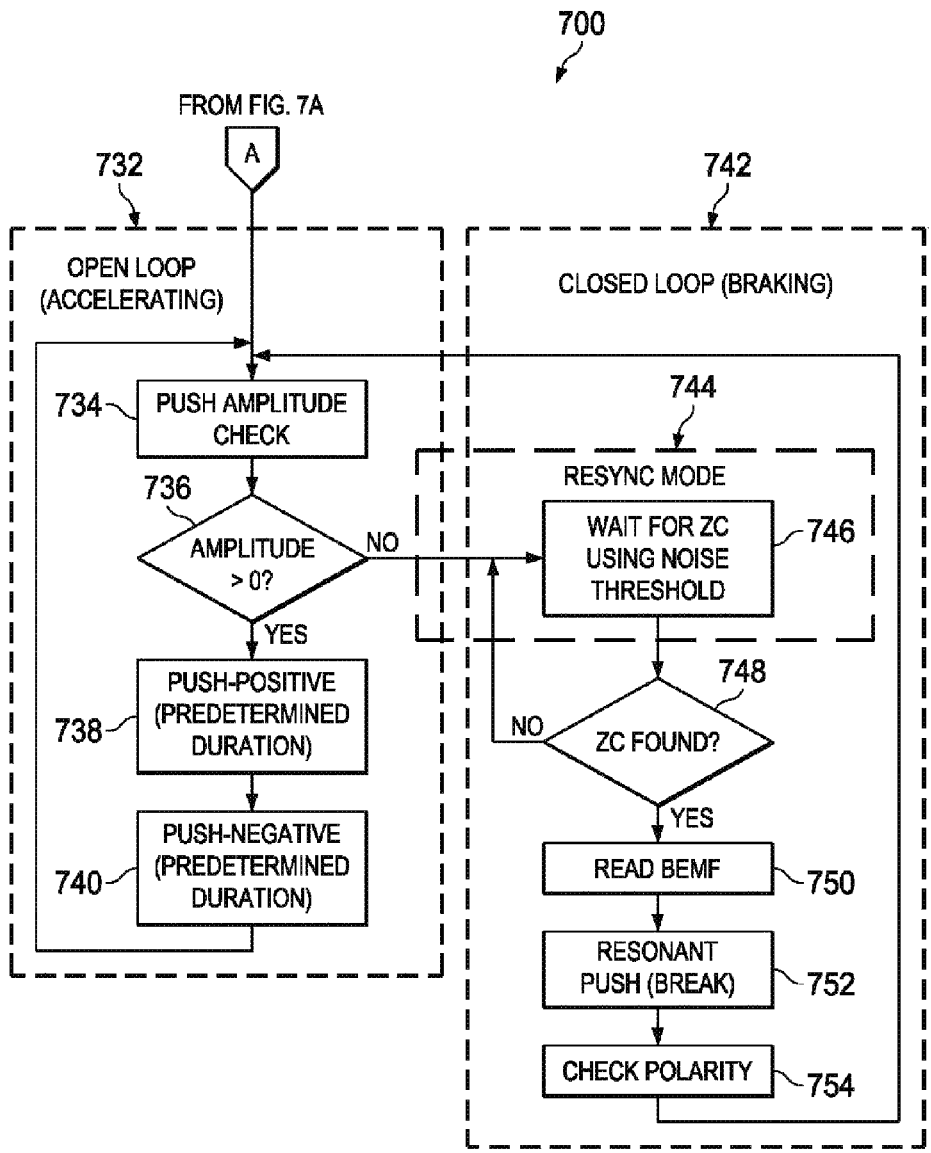

If a zero crossing is identified (YES at 716), the control circuit 120 determines at 718 whether the zero crossing was too fast, for example, occurring before a predetermined wait time. If the zero crossing is determined to have been too fast (YES at 718), a determination is made at 720 as to whether the haptic actuator device 104 is braking. If so (YES at 720), the process returns to 708 as described above. Otherwise (NO at 720), the control circuit 120 performs a push amplitude check at 721, and a second cycle is performed at 730 for a push in the opposite direction, after which the process proceeds to set the polarity at 712 as described above. If the zero crossing was not determined to be too fast (NO at 718) the back EMF feedback signal is read at 722, a push amplitude check is performed at 724, and a resonant push is performed at 726 to cause acceleration or braking of the actuator 104. A polarity check is performed at 728, and the closed loop processing 706 again waits for a zero crossing at 714 as previously described.

Where closed loop operation is not selected (e.g., NO at 704 in FIG. 7A, where the loop control circuit 103 in FIG. 1 indicates open loop commanded control via the CONTROL LOOP signal), open loop acceleration processing 732 is performed by the control circuit 120 as shown in FIG. 7B, including a push amplitude check at 734, and a determination at 736 as to whether the amplitude is greater than zero. If so (YES at 736), the control circuit 120 performs a push positive operation of a predetermined duration at 738, and a push negative operation at 740, and the open loop processing returns to perform another push amplitude check at 734.

Figure 8:
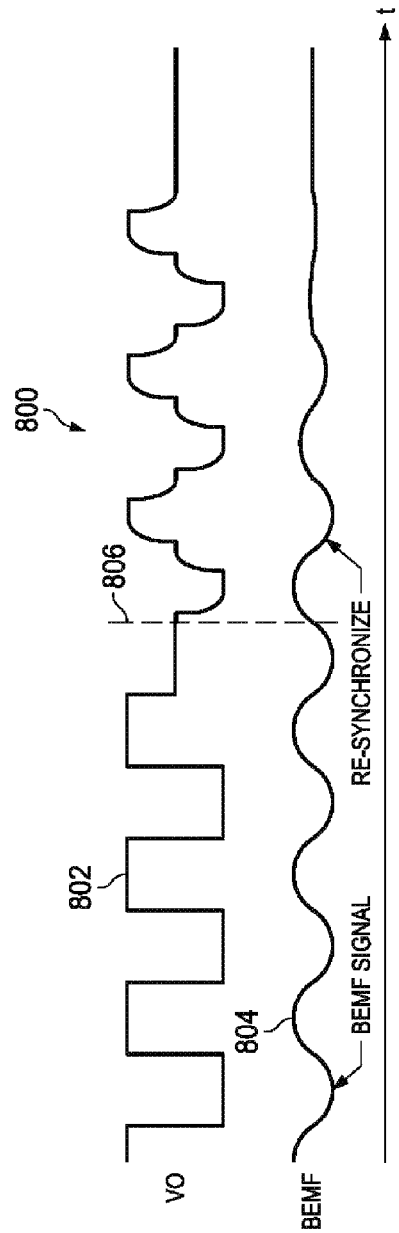
FIG. 8 is a diagram of output voltage and back EMF waveforms.

Referring also to FIG. 8, if the amplitude is zero (e.g., the AMPLITUDE signal from the amplitude control circuit 101 in FIG. 1 corresponds to the brake signal 134 to bring the haptic actuator 104 to a stop or rest condition), closed loop active braking control is initiated at 742 including a resync operation 744 is performed by the control circuit 120 including waiting for a zero crossing using a noise threshold at 746, and checking for a zero crossing at 748. FIG. 8 illustrates a graph 800 showing an output voltage signal waveform 800 and a back EMF feedback signal waveform 804 in the IC 100 of FIG. 1, including resynchronizing after time 806 (e.g., 744 in FIG. 7B). Once a zero crossing is identified (YES at 748 in FIG. 7B), the control circuit 120 reads the BEMF signal from the feedback circuit 126 at 750 in FIG. 7B, and performs a resonant push at 752 to oppose the movement of the mass to brake the actuator 104. A polarity check is performed at 754, and the open loop control processing 732 is resumed with another push amplitude check at 734 as described above.

Figure 9:
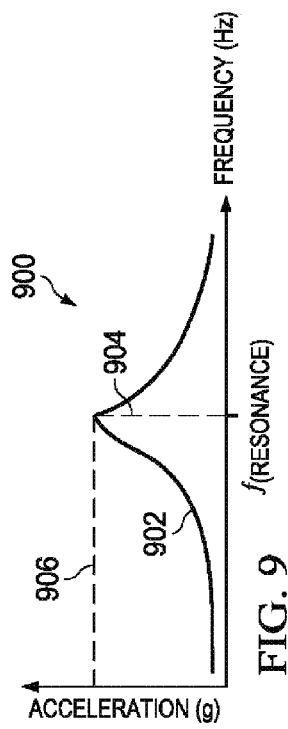
FIG. 9 is a diagram of acceleration versus frequency of a haptic actuator.

FIG. 9 provides a graph 900 showing acceleration versus frequency performance of a haptic actuator 104. As shown, the acceleration curve 902 of the actuator 104 is maximized through operation at a resonance frequency 904 to achieve a maximum acceleration amplitude 906. In the example closed loop operation, the control circuit 120 uses the back EMF feedback signal BEMF to determine whether the actuator 104 is being driven at the resonance frequency 904, and selectively adjusts the drive control signal CD according to the selected mode to drive the actuator 104 at the fixed amplitude 130 set by the AMPLITUDE signal. In certain examples, the control circuit 120 selectively uses automatic overdrive when the BEMF is below a target value to get to the target BEMF level faster. The drive control signal CD in one example is regulated by a feedback loop and automatically adjusts to the correct level to achieve consistent target levels, with the control circuit 120 deciding to overdrive, drive with smaller amplitudes, or even oppose the movement (brake) automatically to reduce the error signal.

Figure 10:
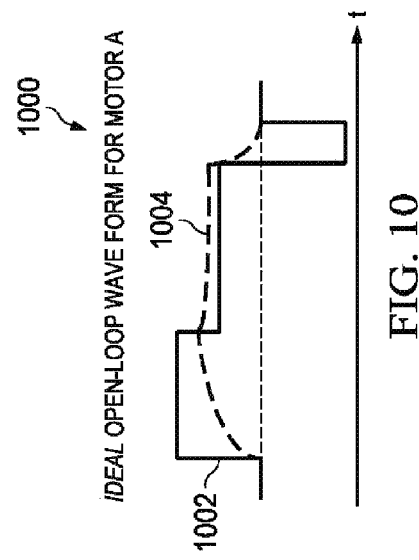
FIG. 10 is a diagram of open loop waveforms for an example first haptic actuator.
Figure 11:
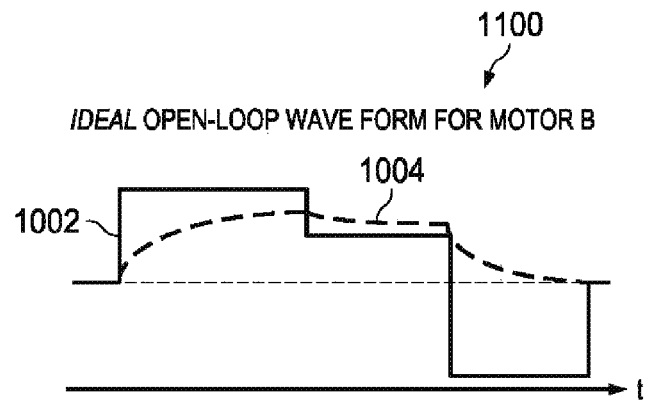
FIG. 11 is a diagram of open loop waveforms for an example second haptic actuator.
Figure 12:
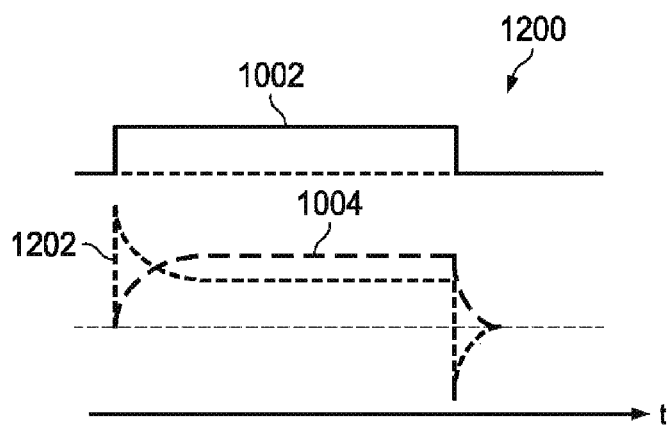
FIG. 12 is a diagram of closed loop waveforms for a haptic actuator.

Referring also to FIGS. 10-12, a graph 1000 in FIG. 10 shows an ideal open loop drive control signal 1002 provided by the control circuit 120 and an ideal acceleration waveform 1004 corresponding to a first actuator 104 driven by the IC 100 in open loop operation. A graph 1100 in FIG. 11 shows a different set of ideal open loop drive control input and acceleration waveforms 1002 and 1004, respectively, for a second haptic actuator example 104. The graph 1200 and FIG. 12 shows closed loop waveforms for a haptic actuator which can be provided for proper operation of a number of different haptic actuators 104 using information from the feedback circuit 126 to facilitate automatic overdrive and active braking. Automatic overdrive and active braking operation by the control circuit 120 advantageously mitigate the need to manually create waveforms to obtain faster and sharper start time and brake time. The automatic operation of the control circuit 120 and the haptic driver IC 100 in the disclosed examples facilitates these goals as shown in FIG. 12 using closed loop operation.

Figure 13:
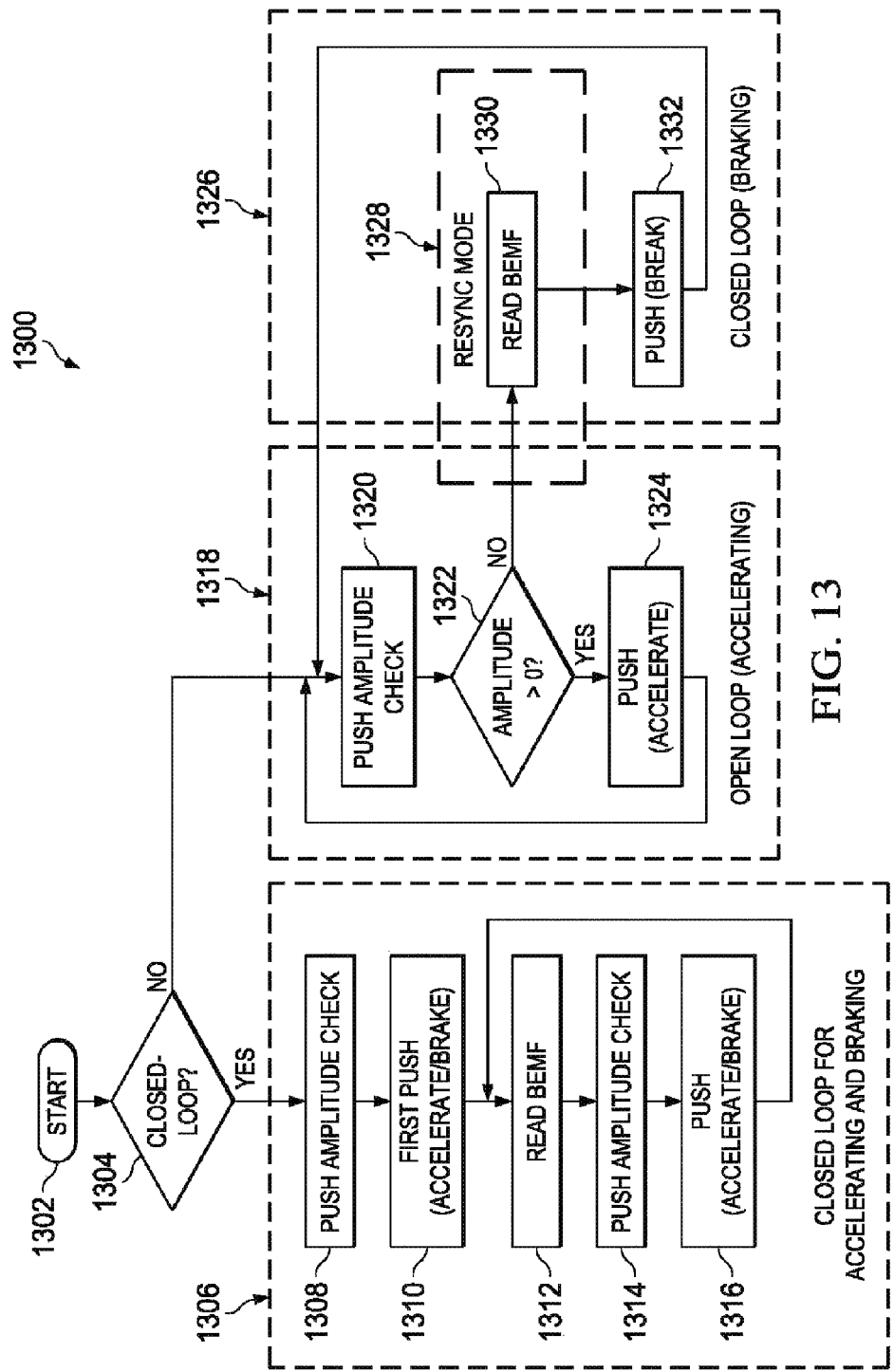
FIG. 13 is a flow diagram showing example open and closed loop control operation in the haptic driver IC of FIG. 1 to drive an eccentric rotating mass motor actuator.

Referring now to FIG. 13, a flow diagram 1300 presents example open and closed loop control operation in the haptic driver IC of FIG. 1 to drive an ERM motor haptic actuator 104. The process 1300 starts at 1302, and the control circuit 120 determines at 1304 whether the CONTROL LOOP signal indicates closed loop operation. If so (YES at 1304), closed loop operation is performed at 1306, including a push amplitude check at 1308 and a first push operation at 1310. At 1312, the control circuit 120 reads the feedback signal BEMF and performs a push amplitude check at 1314, followed by a push accelerate/brake operation at 1316. If closed loop operation is not indicated by the CONTROL LOOP signal (NO at 1304), the control circuit 120 initiates open loop acceleration operation at 1318, including performing a push amplitude check at 1320, and determining whether the amplitude is greater than zero at 1322. If so (YES at 1322, the control circuit 120 performs a push accelerate operation at 1324, and returns for another push amplitude check at 1320 as previously described. If the amplitude is zero (NO at 1322), closed loop braking operation is performed at 1326 with a resync operation 1328 including reading the feedback signal BEMF at 1330, and the control circuit 120 performs a push operation at 1332, after which the open loop acceleration process 1318 resumes with a push amplitude check at 1320 as described above.

Figure 14:
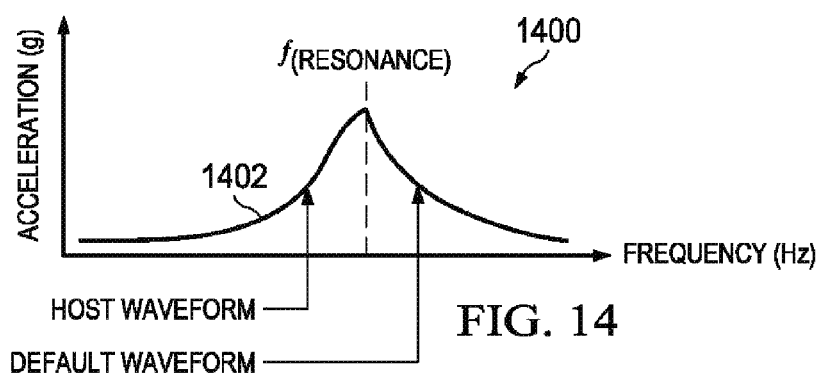
FIG. 14 is a diagram of acceleration versus frequency showing selective use of first and second driver waveform shapes in the haptic driver IC of FIG. 1.

Referring also to FIG. 14, in certain examples, the control circuit 120 is programmed (e.g., using the interface 180) by the host device 102 to selectively provide the drive control signal CD to operate the haptic actuator 104 using a host-selected waveform shape. Moreover, certain examples of the IC 100 provide for use of a host-selected waveform shape, such as a sinewave in one example, for accelerating the actuator 104 and use of a default shape for braking operations. In one example, the control circuit 120 provides the signal CD for braking using a waveform as shown in FIG. 8 following the re-synchronization at 806. In certain examples, moreover, the control circuit 120 uses the host-selected waveform shape for driving the actuator 104 along a curved 1402 in the graph 1400 of FIG. 14 at frequencies below the resonant frequency, and driving the actuator 104 at frequencies above the resonant frequency using a default waveform. Any suitable waveforms can be used.

Disclosed examples simplify the interface of the driver IC 100 and automatically employ advanced closed loop control to facilitate sharp, easily discernible haptic effects, while only using a single high/low control signal TRIGGER from the host device 102. The simple interface, moreover, allows the host device 102 to implement waveforms of customized length, with automatic overdrive and braking by simply sending the start and stop signal states of the TRIGGER signal. With respect to the host device 102, moreover, certain embodiments of the disclosed IC 100 enable use of LRA actuators 104 controlled in a way as simple as controlling ERM-type haptic actuators. The device 102 can implement the control of the haptic driver IC 100 using a single general-purpose I/O for simple single wire control in certain embodiments. Moreover, the IC 100 automatically goes into a low power operating mode following the termination of a haptic actuation, thereby conserving power. Moreover, the IC 100 quickly wakes up from low power mode, as little or no preprogramming or configuration is required by the host device 102. In this regard, certain examples need not provide a digital front end (e.g., the interface 180 may be omitted), and no further digital communications is required for waveform selection or other functions of the IC 100. In this regard, certain conventional haptic drivers require transmission of information for playback of predetermined waveforms either through a digital interface (such as I$^2$C), pulse width modulated signaling, or waveforms must be retrieved from memory (either internal or external), thereby imposing hardware and software requirements on the host device to oversee waveform playback. The described examples, in contrast, provide a single wire interface that enables the host device 102 to create vibration waveforms with a single GPIO, without having to oversee overdrive and braking or provide any other information beyond the duration of the vibration. This facilitates reproduction of advanced haptic waveforms, such as multiple successive clicks without requiring a waveform library or waveform streaming through PWM or a digital front end. The single-wire interface in other embodiments can be implemented by a single register write to let the device know when to start playback, and another register write to let the device know when to stop. Certain implementations only use a single wire to transmit the information related to the vibration/haptic waveform. If a digital front end is included in the IC 100, such front can be used, by means of a register write, to indicate starting of a waveform and a register write to indicate stopping of the waveform. Moreover, the disclosed embodiments do not require a waveform library or waveform data streaming. The proposed solution also enables products to provide high quality vibrations, such as double clicks and sharp alarms without the need of an external controller, since the IC 100 can directly interface with a mechanical button or other such symbol user interface host device 102.

Modifications are possible in the described embodiments, and other embodiments are possible, within the scope of the claims.

What is claimed is:

1. An integrated circuit (IC) to drive a haptic actuator, the IC comprising:
    a driver circuit having: a driver input; and a driver output to drive a haptic actuator according to the driver input;
    an amplitude circuit having: an amplitude circuit input coupled to an input pin; and an amplitude circuit output to provide an amplitude signal for driving the haptic actuator at a non-zero amplitude in response to the input pin having a first control signal state, and for stopping the haptic actuator in response to the input pin having a second control signal state;
    a timer circuit having: a timer input coupled to the input pin; and a timer output to have a first timer signal state for a predetermined time responsive to the input pin changing to the second control signal state, and to otherwise have a second timer signal state;
    a logic circuit having: a first logic circuit input coupled to the input pin; a second logic circuit input coupled to the timer output; and a logic circuit output to have a first enable signal state when the input pin has the first control signal state or when the timer output has the first timer signal state, and to have a second enable signal state when the input pin has the second control signal state and the timer output has the second timer signal state; and
    a control circuit having: a first control circuit input coupled to the amplitude circuit output; a second control circuit input coupled to the logic circuit output; and a control circuit output coupled to provide a drive control signal to the driver input when the logic circuit output has the first enable signal state, the drive control signal being at least partially according to the amplitude signal, and to refrain from providing the drive control signal to the driver input when the logic circuit output has the second enable signal state.

2. The IC of claim 1, comprising: a feedback circuit having: a feedback circuit input, coupled to the driver output, to sense an operating condition of the haptic actuator; and a feedback circuit output to provide a feedback signal to the control circuit; and a loop control circuit to selectively command the control circuit to provide the drive control signal in a closed loop control mode according to the amplitude signal and the feedback signal, or in an open loop control mode according to the amplitude signal.

3. The IC of claim 2, wherein the loop control circuit includes: a first circuit to provide a loop control signal: in a first loop control signal state representing a command for open loop control in response to the first circuit receiving a loop select signal in a first loop state; and in a second loop control signal state representing a command for closed loop control in response to the first circuit receiving the loop select signal in a second loop state; and a second circuit to command the control circuit to provide the drive control signal: in the open loop control mode according to the amplitude signal when the loop control signal has the first loop control signal state and the input pin has the first control signal state; and in the closed loop control mode according to the amplitude signal and the feedback signal when the loop control signal has the second loop control signal state or when the input pin has the second control signal state.

4. The IC of claim 3, wherein the control circuit is operative to place the IC in a low power mode responsive to the logic circuit output having the second enable signal state.

5. The IC of claim 2, wherein the loop control circuit is operative to selectively command the control circuit to operate in the closed loop control mode responsive to the input pin changing from having the first control signal state to having the second control signal state.

6. The IC of claim 5, wherein the control circuit is operative to place the IC in a low power mode responsive to the logic circuit output having the second enable signal state.

7. The IC of claim 6, wherein the control circuit is operative to provide the drive control signal with a host triggered waveform shape when the logic circuit output has the first enable signal state and when the loop control circuit commands the control circuit to provide the drive control signal in the open loop control mode according to the amplitude signal; and wherein the control circuit is operative to provide the drive control signal with a default waveform shape when the logic circuit output has the first enable signal state responsive to the input pin changing from having the first control signal state to having the second control signal state.

8. The IC of claim 5, wherein the control circuit is operative to provide the drive control signal with a host triggered waveform shape when the logic circuit output has the first enable signal state and when the loop control circuit commands the control circuit to provide the drive control signal in the open loop control mode according to the amplitude signal; and wherein the control circuit is operative to provide the drive control signal with a default waveform shape when the logic circuit output has the first enable signal state responsive to the input pin changing from having the first control signal state to having the second control signal state.

9. The IC of claim 2, wherein the control circuit is operative to place the IC in a low power mode responsive to the logic circuit output having the second enable signal state.

10. The IC of claim 2, wherein the control circuit is operative to provide the drive control signal with a host triggered waveform shape when the logic circuit output has the first enable signal state and when the loop control circuit commands the control circuit to provide the drive control signal in the open loop control mode according to the amplitude signal; and wherein the control circuit is operative to provide the drive control signal with a default waveform shape when the logic circuit output has the first enable signal state responsive to the input pin changing from having the first control signal state to having the second control signal state.

11. The IC of claim 2, wherein the control circuit is operative to provide the drive control signal in the open loop control mode according to an arbitrary waveform.

12. The IC of claim 11, wherein the control circuit is operative to provide the drive control signal with a host triggered waveform shape when the logic circuit output has the first enable signal state; and wherein the control circuit is operative to provide the drive control signal with a default waveform shape when the logic circuit output has the first enable signal state responsive to the input pin changing from having the first control signal state to having the second control signal state.

13. The IC of claim 1, wherein the control circuit is operative to place the IC in a low power mode responsive to the logic circuit output having the second enable signal state.

14. The IC of claim 1, wherein the control circuit is operative to provide the drive control signal with a host triggered waveform shape when the logic circuit output has the first enable signal state; and wherein the control circuit is operative to provide the drive control signal with a default waveform shape when the logic circuit output has the first enable signal state responsive to the input pin changing from having the first control signal state to having the second control signal state.

15. The IC of claim 14, wherein the non-zero amplitude is adjustable.

16. The IC of claim 1, wherein the control circuit is operative to provide the drive control signal in an open loop control mode, and to switch to a closed loop braking control mode using at least one feedback signal responsive to the input pin changing from having the first control signal state to having the second control signal state.

17. The IC of claim 1, wherein the first control signal state of the input pin is indicated by a first voltage level or a level transition in a first direction, and wherein the second control signal state of the input pin is indicated by a second voltage level or a level transition in a second direction.

18. The IC of claim 1, wherein the first control signal state of the input pin is indicated by a first pulse, and wherein the second control signal state of the input pin is indicated by a second pulse received after the first pulse or by non-receipt of a second pulse within a second predetermined time after receipt of the first pulse.

* * * * *